(12) United States Patent
Hoshino et al.

(10) Patent No.: US 7,959,304 B2
(45) Date of Patent: Jun. 14, 2011

(54) PROJECTOR

(75) Inventors: Hidetaka Hoshino, Nagoya (JP); Yoshito Hosoi, Nagoya (JP); Tomoyuki Okamoto, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 365 days.

(21) Appl. No.: 12/178,284

(22) Filed: Jul. 23, 2008

(65) Prior Publication Data

US 2009/0027628 A1 Jan. 29, 2009

(30) Foreign Application Priority Data

Jul. 24, 2007 (JP) ................................ 2007-192121

(51) Int. Cl.
*G03B 21/28* (2006.01)

(52) U.S. Cl. .......................................... 353/98; 353/50

(58) Field of Classification Search .................... 353/37, 353/50, 98, 99; 359/449
See application file for complete search history.

(56) References Cited

U.S. PATENT DOCUMENTS

| 6,631,994 | B2 | 10/2003 | Suzuki et al. | |
|---|---|---|---|---|
| 6,824,274 | B2 | 11/2004 | Suzuki et al. | |
| 6,994,437 | B2 | 2/2006 | Suzuki et al. | |
| 7,230,774 | B2 | 6/2007 | Suzuki et al. | |
| 2003/0174120 | A1* | 9/2003 | Weiner et al. | 345/156 |
| 2007/0201009 | A1 | 8/2007 | Suzuki et al. | |

FOREIGN PATENT DOCUMENTS

| JP | 10-307202 | 11/1998 |
|---|---|---|
| JP | 2002-207168 | 7/2002 |
| JP | 2003-235037 | 8/2003 |
| JP | 2003-235038 | 8/2003 |
| JP | 2006-337850 | 12/2006 |
| WO | 2006070869 | 6/2006 |

* cited by examiner

*Primary Examiner* — Kevin Pyo
(74) *Attorney, Agent, or Firm* — Banner & Witcoff, Ltd

(57) ABSTRACT

A projector which is configured to project an image by means of a projection light onto a surface approximately parallel, or a surface approximately perpendicular, to an installation surface. According to aspects of the disclosure, the projector may include a first reflecting surface which reflects the projection light toward the approximately parallel surface; a second reflecting surface which reflects the projection light toward the approximately perpendicular surface; and a reflecting surface switching section which can switchably place the first reflecting surface and the second reflecting surface in an optical path of the projection light.

10 Claims, 10 Drawing Sheets

PROJECTOR

CROSS-REFERENCE TO RELATED APPLICATION(S)

This application is based on and claims the benefit of priority from Japanese Patent Application No. 2007-192121 filed on Jul. 24, 2007; the entire contents of which are incorporated herein by reference.

BACKGROUND OF THE INVENTION

1. Field of the Invention

The present invention relates to a projector which projects an image by means of a projection light onto a surface approximately parallel, or a surface approximately perpendicular, to an installation surface.

2. Description of the Related Art

To date, among projectors, there have been a type which projects an image onto a surface approximately parallel to its installation surface (for example, onto a table on which the projector is installed), and a type which projects the image onto a surface approximately perpendicular to the installation surface (for example, a wall surface or a screen). Also, a projector of a type which, by changing a direction of a main body which causes a projection light to emerge, can project the image onto both the surface approximately parallel, and the surface approximately perpendicular, to the projector's installation surface, has also existed (for example, refer to Japanese Unexamined Patent Publication No. 2006-337850).

SUMMARY OF THE INVENTION

However, regarding also a projector of a type which cannot change a direction of a main body which causes a projection light to emerge, there is a request to arrange in such a way that the image can be projected onto both a surface approximately parallel, and a surface approximately perpendicular, to its installation surface. In this case, in the projector, it is common that a reflecting mirror is provided in an optical path of the projection light and, by adjusting an orientation of the reflecting mirror, the projection light is emitted toward the surface (for example, a table surface) approximately parallel to the installation surface, or toward the surface (for example, a wall surface) approximately perpendicular to the installation surface.

FIGS. 9A and 9B show one example of a heretofore known projector 100' including a reflecting mirror. In FIG. 9A, in order to prevent a confusion in the figure, only a main body 10' and a reflecting mirror 20', among components of the projector 100' are illustrated, and the other parts are omitted from the illustration. A light modulation device 50' is incorporated in the main body 10'. A projected image is formed on the light modulation device 50'. A projection light caused to fall on the light modulation device 50' is caused to emerge from the main body 10' as a projection light having image information modulated by the light modulation device 50'.

The projection light caused to emerge from the main body 10' falls on the reflecting mirror 20'. The reflecting mirror 20' can be held in one of a horizontal and an inclined condition by an unshown holding section. In a case in which the reflecting mirror 20' is placed horizontally, the projection light is reflected toward a table surface S1 which is a surface approximately parallel to a surface on which the projector 100' is installed, and an image is projected onto the table surface S1. On the other hand, in a case in which the reflecting mirror 20' is placed inclined, the projection light is reflected toward a wall surface S2 which is a surface approximately perpendicular to the installation surface, and the image is projected onto the wall surface S2.

FIG. 9A illustrates five light rays of the projection light passing through five points evenly spaced in an X axis direction on the light modulation device 50'. Consequently, in order to project an image formed on the light modulation device 50' onto the table surface S1 or the wall surface S2 without any distortion, it is required that incidence positions of the individual light rays falling on the table surface S1 or the wall surface S2 are evenly spaced.

As shown in FIG. 9A, in the case in which the reflecting mirror 20' is placed horizontally, the five light rays fall on positions A1, B1, C1, D1 and E1 on the table surface S1. As these positions are evenly spaced, the image projected onto the table surface S1 becomes an image having no distortion with respect to the X axis direction.

On the other hand, in the case in which the reflecting mirror 20' is placed inclined, the five light rays fall on positions A2, B2, C2, D2 and E2 on the wall surface S2. These positions are not evenly spaced, and an interval increases toward an upper side. Consequently, the image projected onto the wall surface S2 becomes an image distorted in a Z axis direction.

FIG. 9A shows positions A1' to E1' symmetrical to the positions A1 to E1 on the table surface S1 with respect to a reflecting surface of the reflecting mirror 20' placed horizontally, and positions A2' to E2' symmetrical to the positions A2 to E2 on the wall surface S2 with respect to a reflecting surface of the reflecting mirror 20' placed inclined. As shown in FIG. 9A, as the positions A2' to E2' are inclined with respect to the positions A1' to E1', the incidence positions of the five light rays not being evenly spaced, the image projected onto the wall surface S2 becomes a distorted image.

FIG. 9B is a perspective view showing an image projected onto the wall surface S2 in the case in which the reflecting mirror 20' is placed inclined. In the case in which the reflecting mirror 20' is placed inclined, as shown in FIG. 9B, there has been a problem in that the image expands toward the upper side.

In this way, in the projector which cannot change the direction of the main body causing the projection light to emerge, when attempting to arrange in such a way that an image can be projected both onto the surface approximately parallel to the installation surface, and onto the surface approximately perpendicular to the installation surface, by reflecting the projection light onto a reflecting surface of the reflecting mirror 20', there has been a problem in that one of the images is distorted.

The invention, having been contrived in order to solve the heretofore described problems, has an object of providing a projector which, being a projector of a type which cannot change a direction of a main body which causes a projection light to emerge, can project an image by means of the projection light without any distortion both onto a surface approximately parallel to an installation position, and onto a surface approximately perpendicular to the installation position.

According to one embodiment of the invention, there is provided a projector which projects an image by means of a projection light onto a surface approximately parallel, or a surface approximately perpendicular, to an installation surface, including a first reflecting surface which reflects the projection light toward the approximately parallel surface, a second reflecting surface which reflects the projection light toward the approximately perpendicular surface, and a reflecting surface switching section which can switchably place the first reflecting surface and the second reflecting surface in an optical path of the projection light.

BRIEF DESCRIPTION OF THE DRAWINGS

FIG. 2A is a view of a case in which a reflecting mirror is placed horizontally, while

FIG. 8A is a view of a case in which the reflecting mirror is placed horizontally, while

DESCRIPTION OF THE PREFERRED EMBODIMENT(S)

Hereafter, a detailed description will be given of an embodiment of the invention, based on the drawings.

Figure 1:
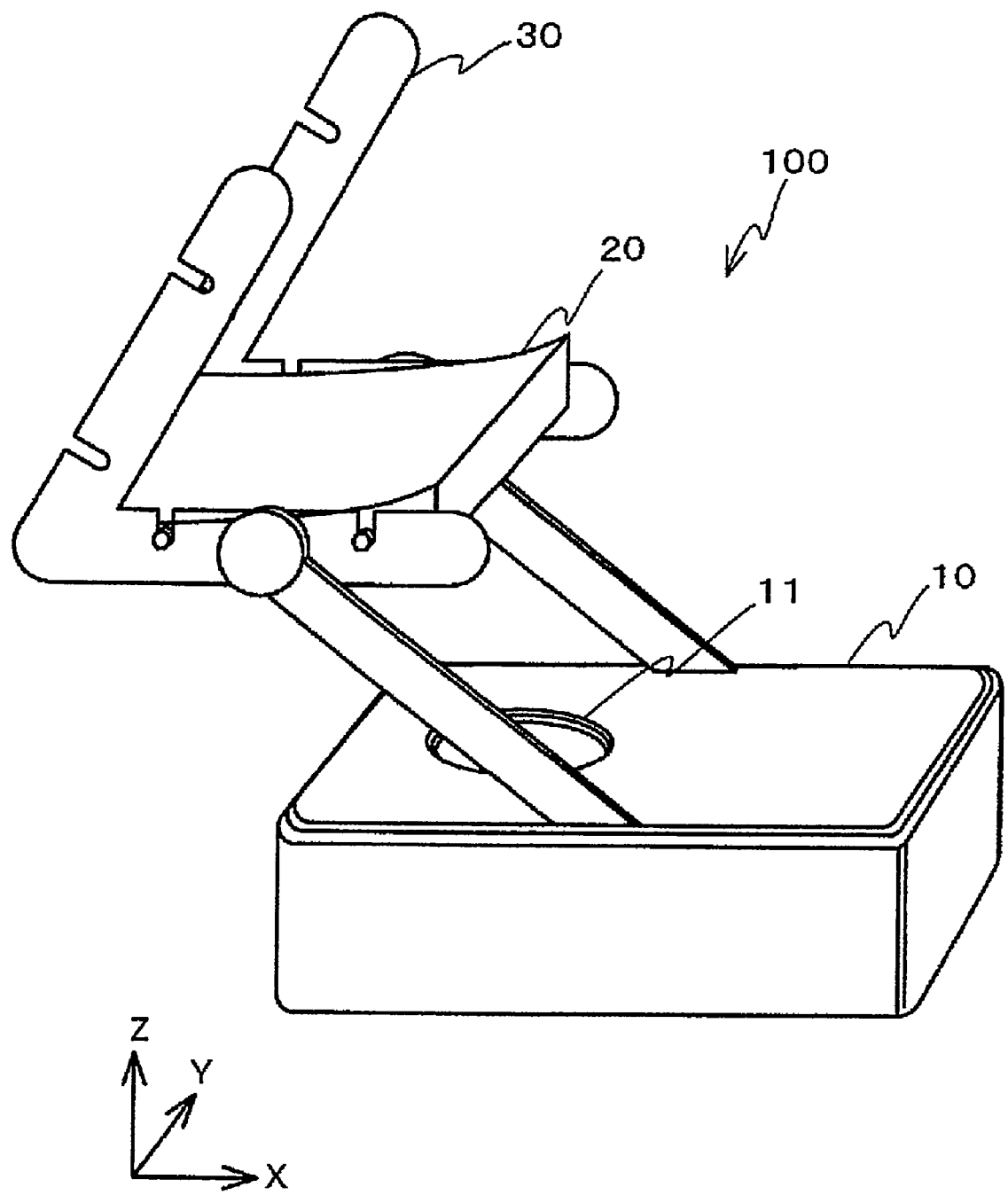
FIG. 1 is a perspective view showing a configuration of a projector according to one embodiment of the invention.

FIG. 1 shows an outline configuration of a projector according to the embodiment of the invention. As shown in FIG. 1, a projector 100 includes a main body 10, a reflecting mirror 20 and a holding section 30.

Figure 2A:
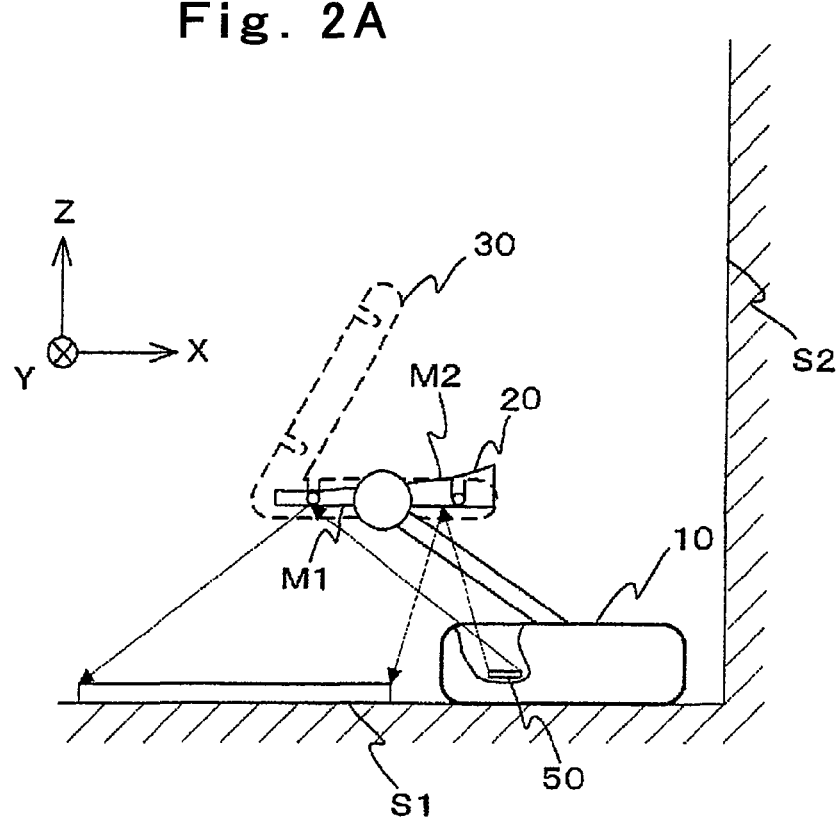
Figure 2B:
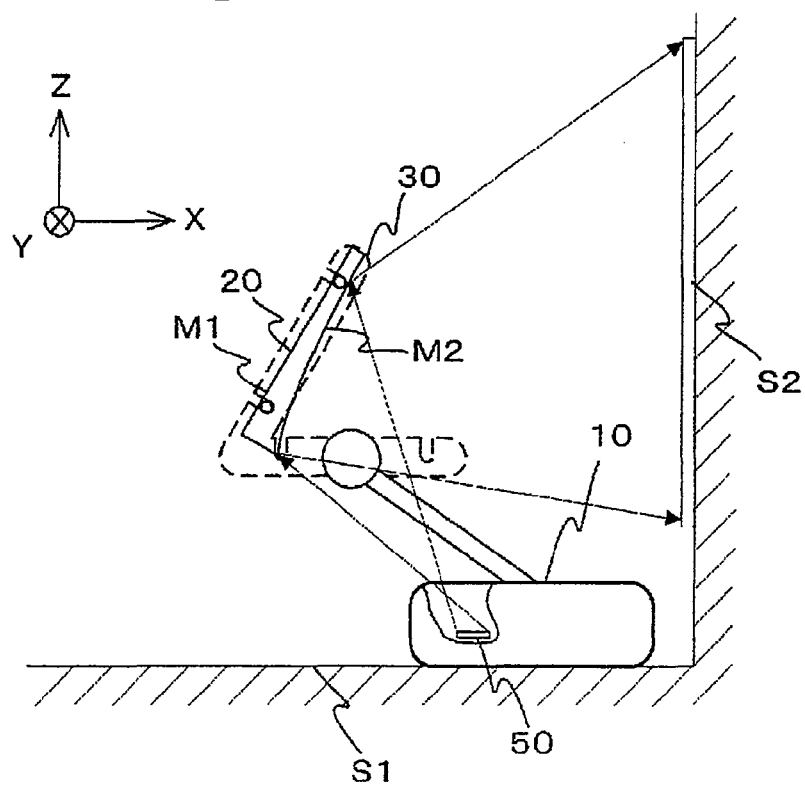
FIG. 2B is a view of a case in which the reflecting mirror is placed inclined.

As shown in FIGS. 2A and 2B, a light modulation device 50 is incorporated in the main body 10. An image to be projected is formed on the light modulation device 50. A projection light caused to fall on the light modulation device 50 is modulated by the light modulation device 50, and caused to emerge from an emitting section 11 of the main body 10 as a projection light having image information.

The reflecting mirror 20 is held in an optical path of the projection light by the holding section 30. Both surfaces of the reflecting mirror 20 form reflecting surfaces. One reflecting surface (a first reflecting surface) M1 of the reflecting mirror 20 forms a planar surface, and the other reflecting surface (a second reflecting surface) M2 forms a curved surface which is not a spherical surface. A reflecting surface switching section is configured of the reflecting mirror 20 and the holding section 30.

FIGS. 2A and 2B show conditions in which the reflecting mirror 20 is held by the holding section 30. As shown in FIGS. 2A and 2B, the holding section 30 can either hold the reflecting mirror 20 in such a way that the reflecting surfaces of the reflecting mirror 20 are approximately horizontal, or can hold the reflecting mirror 20 in a condition in which the reflecting surfaces of the reflecting mirror 20 are inclined.

As shown in FIG. 2A, in the condition in which the reflecting mirror 20 is held horizontal, the reflecting surface M1 being placed in the optical path of the projection light, the projection light caused to emerge from the main body 10 is reflected on the reflecting surface M1, and reaches a table surface S1 which is a surface approximately parallel to an installation surface. On the other hand, as shown in FIG. 2B, in the condition in which the reflecting mirror 20 is held inclined, the reflecting surface M2 being placed in the optical path of the projection light, the projection light caused to emerge from the main body 10 is reflected, and reaches a wall surface S2 which is a surface approximately perpendicular to the installation surface. That is, in the projector 100, it is possible to switchably place the reflecting surface M1 and the reflecting surface M2 in the optical path of the projection light.

In this way, in the projector 100, in the case in which the reflecting mirror 20 is held horizontal, the reflecting mirror 20 is placed with the reflecting surface M1, which is the planar surface, facing down, and in the case in which the reflecting mirror 20 is held inclined, the reflecting mirror 20 is placed in such a way that the reflecting surface M2 which is the curved surface falls in the optical path of the projection light. The reflecting mirror 20, being attachable to, and removable from, the holding section 30, is arranged in such a way that a holding position thereof is switchable when necessary. In the projector 100, it is also acceptable to arrange in such a way as to, in each case, for example, by changing a size of a portion connected to the holding section 30, prevent the other reflecting surface from being placed in the optical path of the projection light.

Figure 3A:
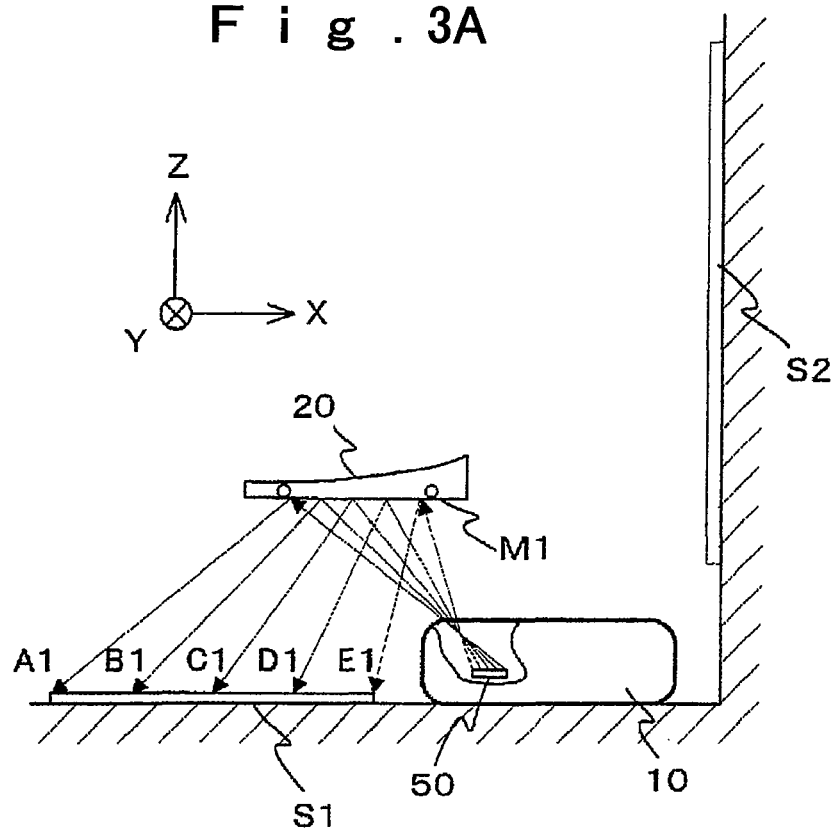
FIGS. 3A and 3B are views for illustrating a principle of correcting an image by means of reflecting surfaces of the reflecting mirror.
Figure 3B:
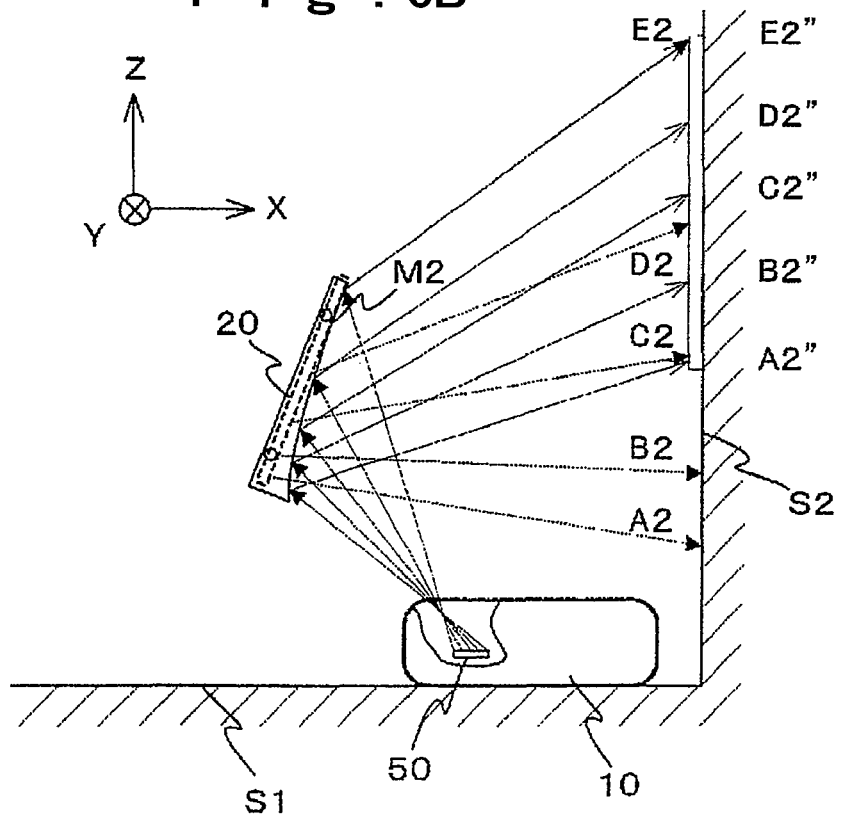

FIGS. 3A and 3B illustrate optical paths of five light rays passing through five different points on the light modulation device 50.

As shown in FIG. 3A, in a case in which the reflecting mirror 20 is held in the horizontal condition, and a reflecting surface of the reflecting mirror 20, on which the projection light falls, is the planar reflecting surface M1, the five light rays fall on positions A1, B1, C1, D1 and E1 on the table surface S1. As these points are evenly spaced, an image projected onto the table surface S1 becomes an image having no distortion with respect to an X axis direction.

On the other hand, as shown in FIG. 3B, in a case in which the reflecting mirror 20 is held in the inclined condition, and a reflecting surface of the reflecting mirror 20, on which the projection light falls, is the curved reflecting surface M2, five projection lights caused to emerge from the light modulation device 50 at even intervals in the X axis direction fall on positions A2", B2", C2", D2" and E2" on the wall surface S2.

For the sake of contrast, FIG. 3B also illustrates incidence positions A2, B2, C2, D2 and E2 of the five projection lights when a reflecting surface on which the projection light falls is a planar surface. In the reflecting mirror 20, as a thickness thereof increases, and a curvature of the reflecting surface M2 becomes larger, toward a lower side, an emergence direction of reflected lights of the five projection lights being shifted to an upper side as a whole, the positions A2", B2", C2", D2" and E2" on the wall surface are evenly spaced, and an image projected onto the wall surface S2 becomes a non-distorted image.

Figure 4A:
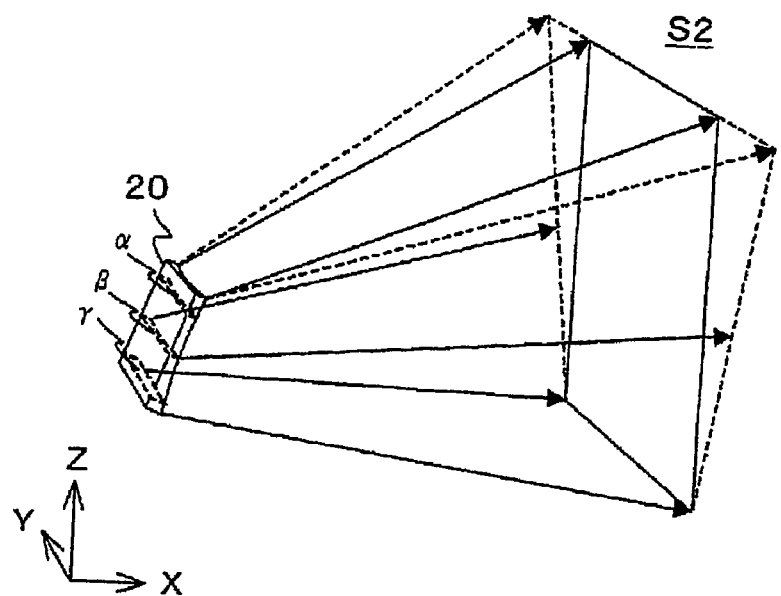
FIGS. 4A to 4D are views for illustrating shapes of the reflecting surfaces of the reflecting mirror.
Figure 4B:
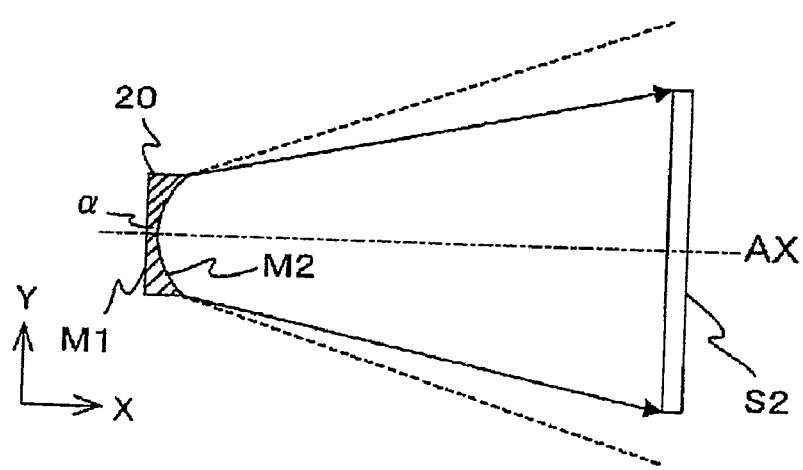

The reflecting surface M2 of the reflecting mirror 20 is not flat but curved with respect to a Y axis direction too. FIG. 4A shows cross-sections α, β and γ of the reflecting mirror 20. FIG. 4B shows an optical path of the projection light falling on a position of the cross-section α of the reflecting mirror 20, FIG. 4C shows an optical path of the projection light falling on a position of the cross-section β of the reflecting mirror 20, and FIG. 4D shows an optical path of the projection light falling on a position of the cross-section γ of the reflecting mirror 20.

As shown in FIG. 4A, the reflecting surface M2 is a concave surface in the cross-section α, but a curvature of a shape of the reflecting surface M2 therein is larger than curvatures of shapes of the reflecting surface M2 in the cross-sections β and γ. By this means, the reflected light of the projection light falling on the position of the cross-section α is reflected deviated toward a center line AX with respect to the Y axis direction.

Also, as shown in FIG. 4B, as the reflecting surface M2 is a concave surface in the cross-section β too, a reflected light of the projection light falling on the portion of the cross-section β is reflected deviated toward the center line AX with respect to the Y axis direction but, as the curvature of the surface shape in the cross-section β is smaller than the curvature of the surface shape in the cross-section α, the deviation of the reflected light toward the center line AX is smaller than that of the reflected light in the cross-section α.

Figure 4C:
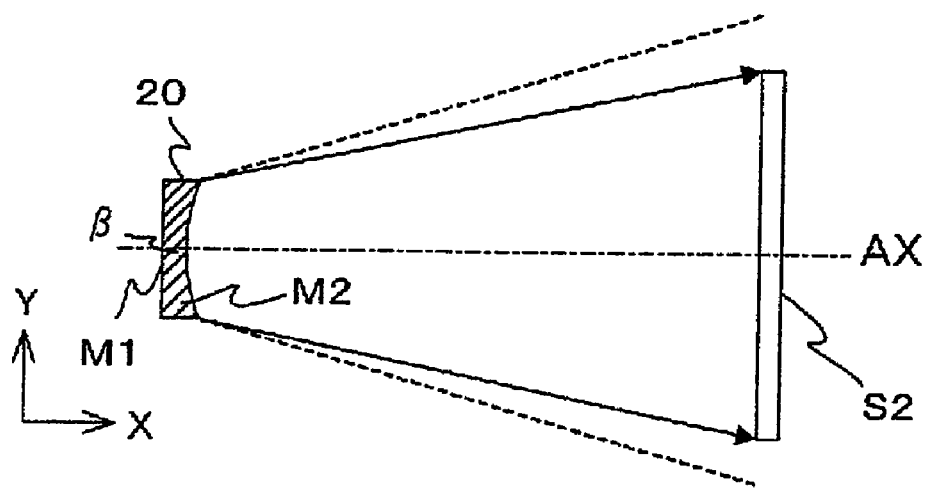
Figure 4D:
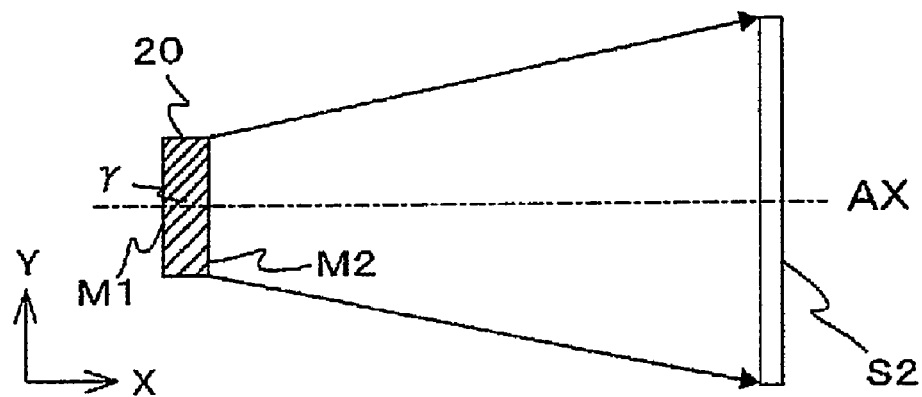

Also, as shown in FIG. 4C, the reflecting surface is approximately flat in the cross-section γ. In this way, the shape of the reflecting surface M2 therein with respect to the Y axis direction is concave, and the curvature thereof becomes smaller toward the lower side. By this means, in the case in which the reflecting mirror 20 is held in such a way that the reflecting surface M2 is inclined, as shown in FIG. 4A, the image projected onto the wall surface S2 is corrected from a trapezoidal, to an original rectangular, image.

Figure 5:
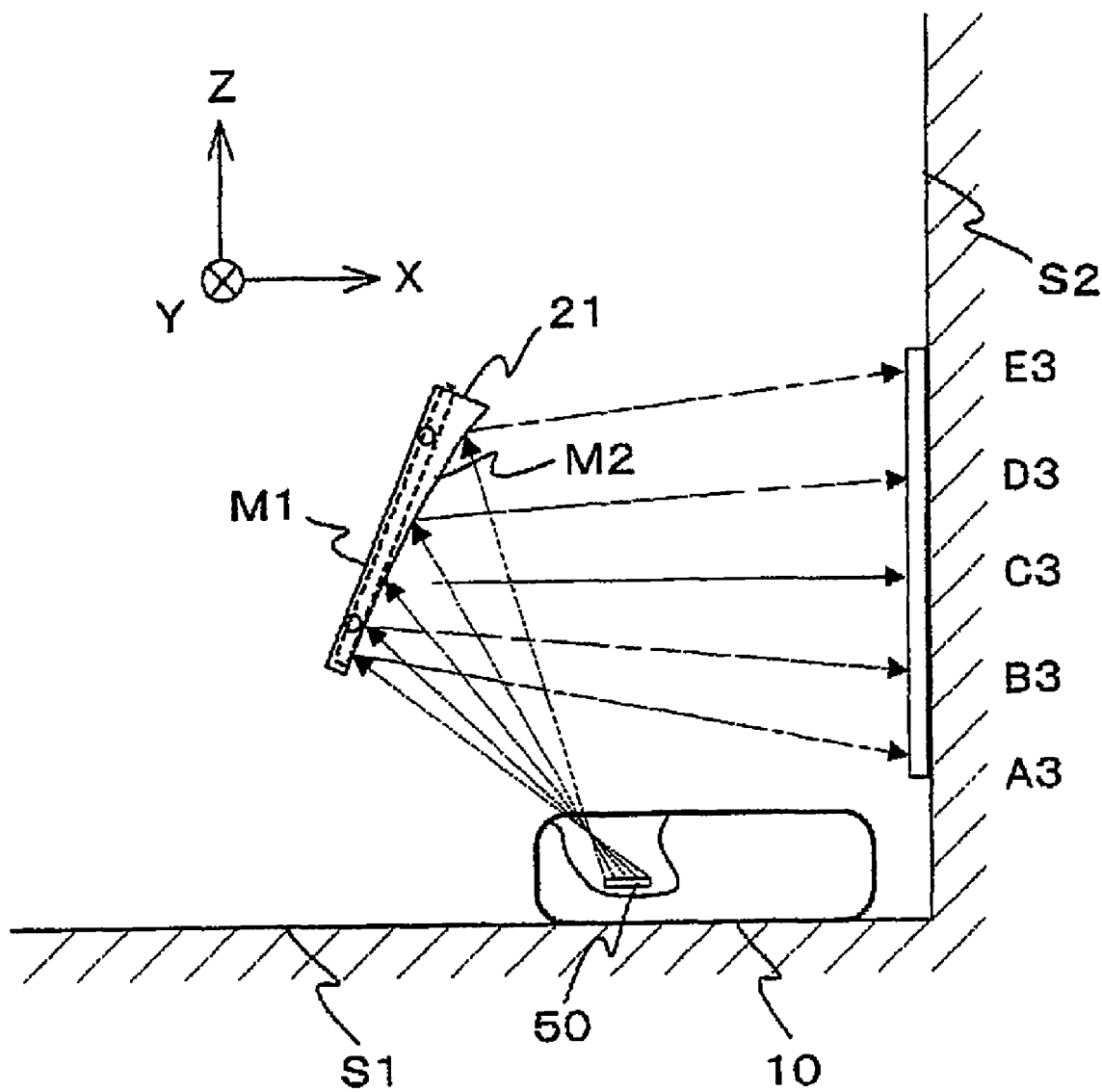
FIG. 5 is a view showing a modification example of the reflecting mirror.

Also in the embodiment, the reflecting mirror 20 is employed in which the thickness increases, and the curvature of the reflecting surface becomes larger, toward the lower side, but it is also acceptable to arrange in such a way as to place a reflecting mirror 21 in which the thickness increases, and the curvature of a reflecting surface is larger, toward the upper side, as shown in FIG. 5. By so doing, a position of the image projected onto the wall surface S2 is shifted to the lower side as a whole, but in this case too, the incidence positions of the five light rays being evenly spaced, it is possible to project the non-distorted image onto the wall surface S2.

In this way, the shapes of the reflecting surface M1 and reflecting surface M2 are different. As the image on the table surface S1 becomes the non-distorted image even when the reflecting surface M1 is made planar, the reflecting surface M1 is made planar, but it is possible to make the shape of the reflecting surface M1 aspherical or free-form in accordance with an image projection condition. Herein, the aspherical surface, being a surface which is not spherical, is a concept including a surface formed by discontinuously bonding curved surfaces, curvatures of which are not constant, or a plurality of planar surfaces. The free-form surface is a kind of curved surface, a shape of which is approximated by a high-degree polynomial. The same applies to the reflecting surface M2.

Figure 6:
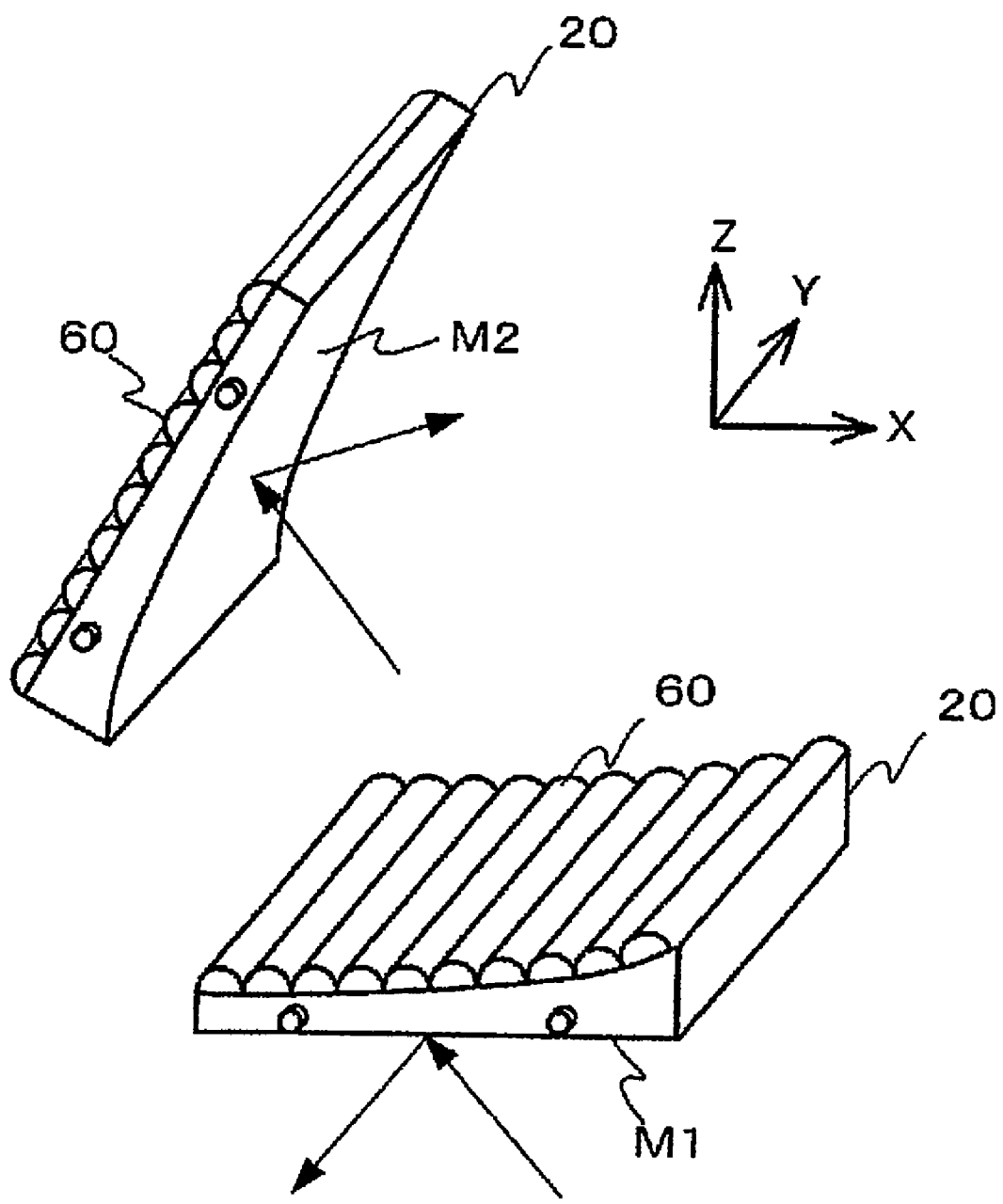
FIG. 6 is a view showing a protective cover of the reflecting mirror.

In the projector 100 according to the embodiment, although one of the first and second reflecting surfaces of the reflecting mirror 20 is utilized as the surface on which the projection light is reflected, the other reflecting surface is not used to reflect the projection light during that time. Therefore, it is also acceptable to arrange in such a way as to include a kind of protective section 60 shown in FIG. 6 which covers an unused reflecting surface. As shown in FIG. 6, in a case of causing the reflecting surface M1 to reflect the projection light, the reflecting surface M2 is covered with the protective section 60 and, in a case of causing the reflecting surface M2 to reflect the projection light, the reflecting surface M1 is covered with the protective section 60. As this kind of protective section 60, generally, one made of a material protecting the reflecting mirror (for example, cloth in which oil is saturated with silicon) is used.

Figure 7A:
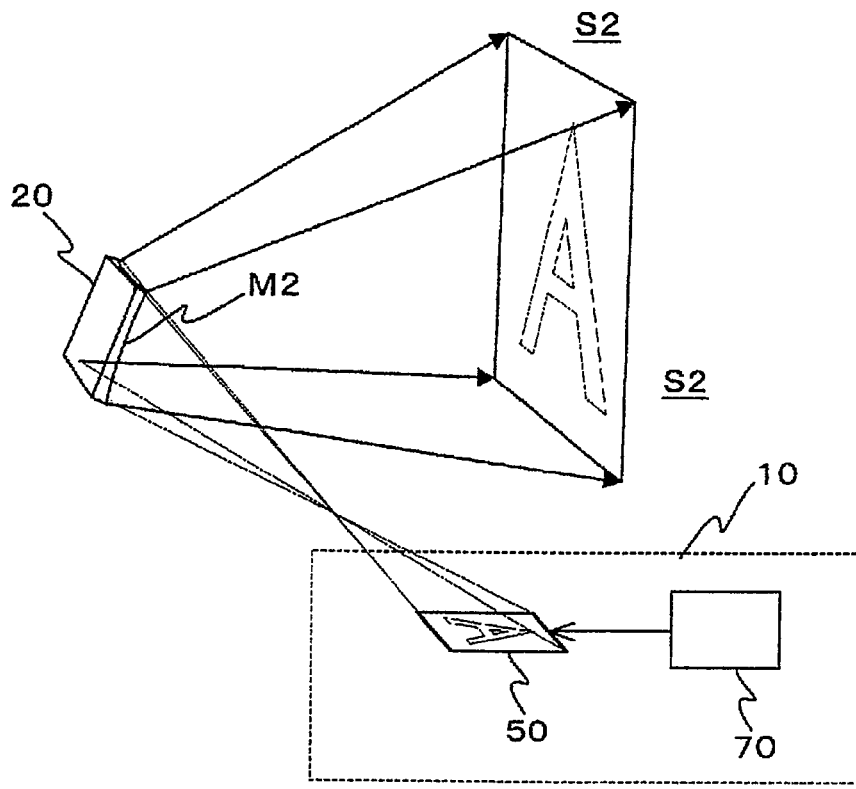
FIGS. 7A and 7B are diagrams for illustrating an optical path of a projection light when projecting the image onto a wall surface.
Figure 7B:
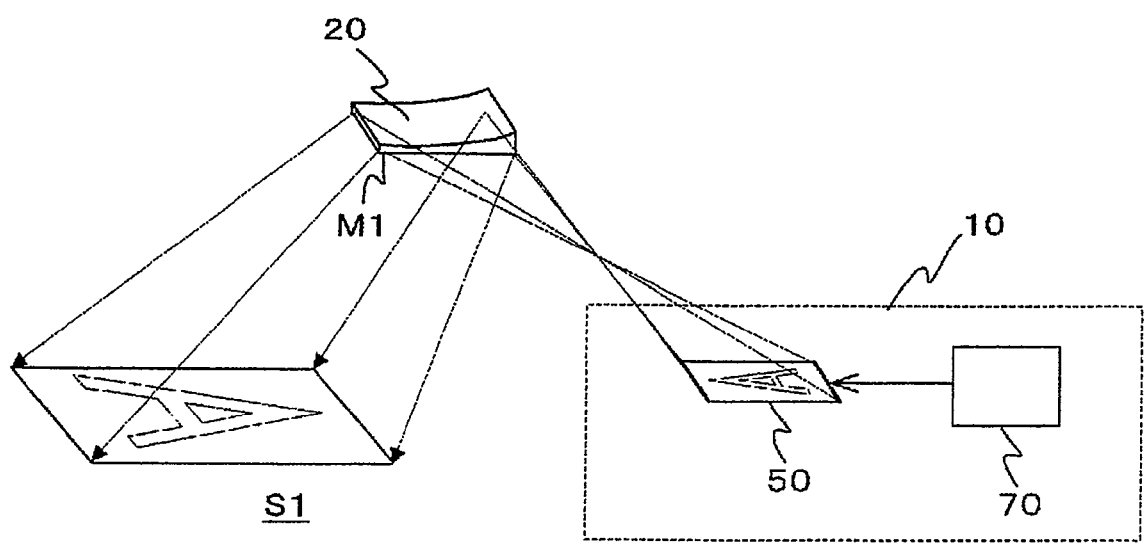

Also, the projector 100 according to the embodiment includes an image switching section 70 as an image inversion section in the main body 10. As shown in FIGS. 7A and 7B, the image switching section 70 switches a direction of an image "A" formed on the light modulation device 50 between a case of attempting to display the image "A" on the table surface S1 and a case of attempting to display the image "A" on the wall surface S2. This switching is carried out by means of a user's operational input with an unshown operation panel or remote controller. By so doing, when a surface onto which the image is projected is switched, it is possible to prevent the projected image from being inverted.

Figure 8A:
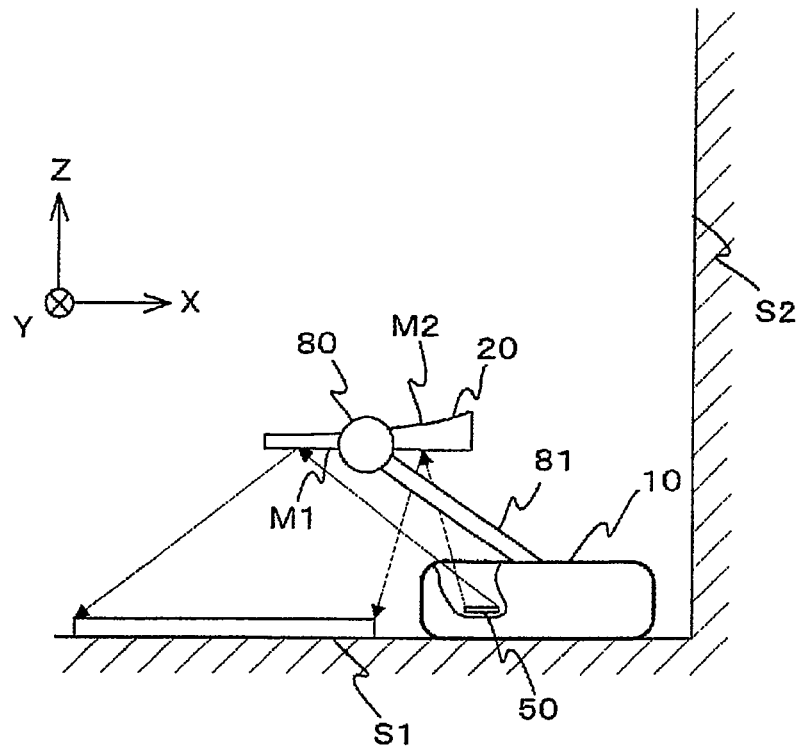
Figure 8B:
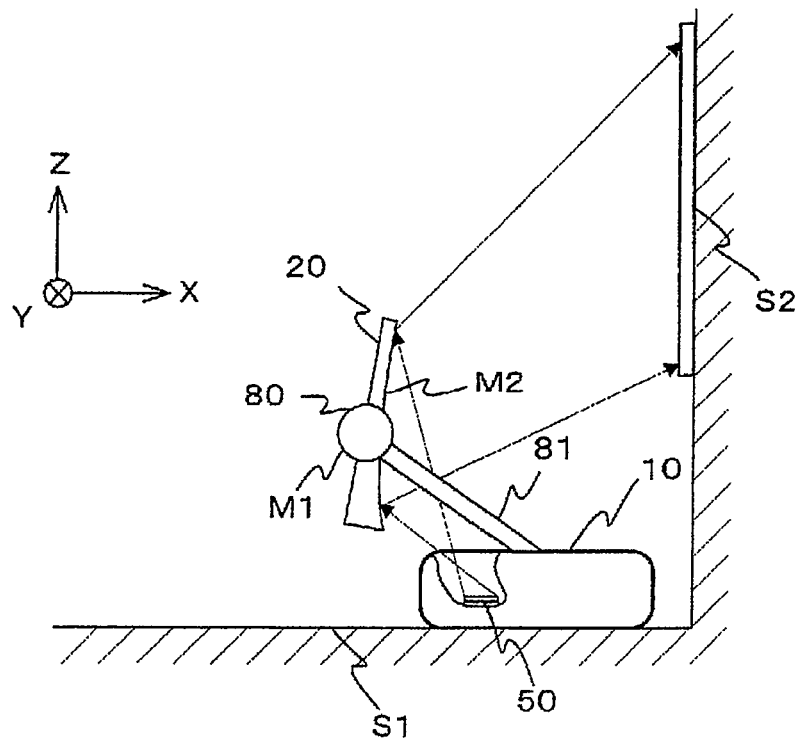
FIG. 8B is a view of a case in which the reflecting mirror is placed inclined.
Figure 9A:
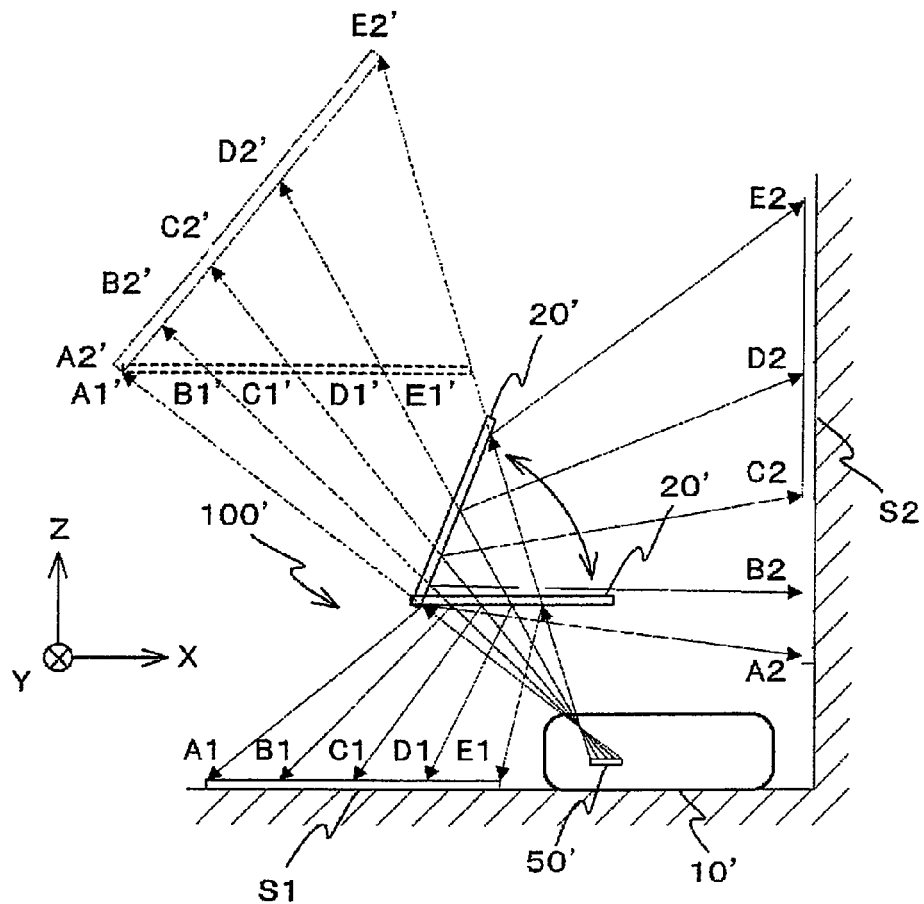
FIGS. 9A and 9B are views showing one example of a heretofore known projector including a reflecting mirror.
Figure 9B:
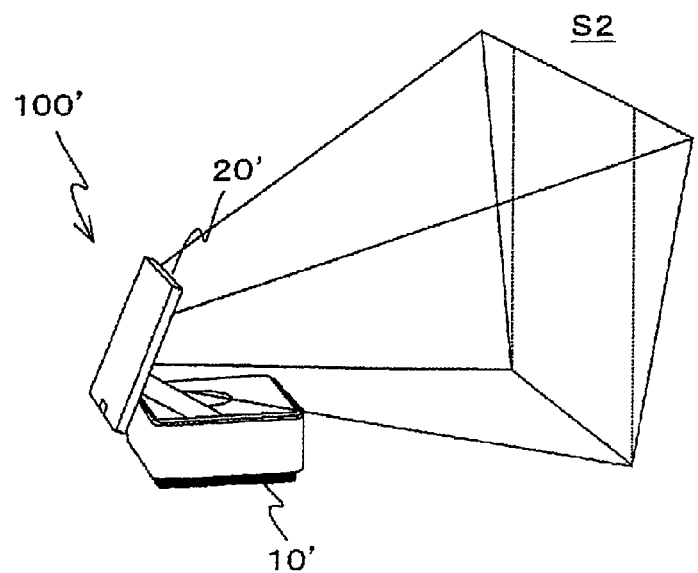

FIGS. 8A and 8B show holding conditions in which the reflecting mirror 20 is rotatably held by a supporting section 81 via a spindle 80. As shown in FIG. 8A, the supporting section 81 holds the reflecting surface M1 of the reflecting mirror 20 approximately horizontally, projecting the projection light caused to emerge from the light modulation device 50 onto the table surface S1. Also, as shown in FIG. 8B, the reflecting mirror 20 is rotated around the spindle 80, and the supporting section 81 holds the reflecting surface M2 of the reflecting mirror 20 approximately vertically, projecting the projection light caused to emerge from the light modulation device 50 onto the wall surface S2. In this case, the reflecting surface switching section is the spindle 80. As an arrangement is such that the supporting section 81 rotatably holds the reflecting mirror 20 in this way, it is possible to easily switch between the case of the projection onto the table surface and the case of the projection onto the wall surface.

As heretofore described in detail, according to the projector 100 of the embodiment, the reflecting mirror 20 being a double-sided mirror, the reflecting surface M1, which reflects the projection light toward the table surface S1 approximately parallel to the installation surface, and the reflecting surface M2, which reflects the projection light toward the wall surface S2 approximately perpendicular to the installation surface, can be switchably placed in the optical path of the projection light. By so doing, as the reflecting surface M1, used when projecting an image onto the table surface S1, and the reflecting surface M2, used when projecting an image onto the wall surface S2, can be made different surfaces, it is possible to form the individual reflecting surfaces M1 and M2 into kinds of reflecting surface on which the projected images are not distorted. As a result thereof, it is possible to project an image by means of the projection light without any distortion onto the table surface S1 approximately parallel to the installation surface, as well as onto the wall surface S2 approximately perpendicular to the installation surface.

Also, according to the embodiment, it is possible to form the shapes of the one reflecting surface M1 and the other reflecting surface M2 of the reflecting mirror 20 into kinds of shape in which the projected images are not distorted.

Also, as in the embodiment, at least one of both reflecting surfaces M1 and M2 of the reflecting mirror 20 can be formed into the aspherical surface or the free-form surface in such a way that the distortion of the projected images is corrected. A design of the shape of the reflecting surfaces can be appropriately changed in such a way that they have a kind of shape in which an image can be projected without any distortion onto a projection surface which is an object. Herein, for example, it is possible to employ a reflecting mirror in which, for example, piezoelectric elements or the like are arrayed on a back side of a reflecting surface and, by driving each piezoelectric element, it is possible to adjust a surface shape. By employing this kind of reflection mirror, even in the event that the projection surface onto which the image is projected is changed, it is possible to adjust the shape of the reflecting surface for each projection surface, and correct a distortion of the projected image.

Naturally, it is needless to say that, as in the embodiment, one of both reflecting surfaces M1 and M2 of the reflecting mirror 20 can be formed into the planar surface.

Also, according to the embodiment, as the image switching section 70 is included which inverts the image by means of the projection light by switching between the case in which the image is projected onto the table surface S1 and the case in which the image is projected onto the wall surface S2, even in the event that the image projection position is changed, it is possible to project the image in a desired direction.

Also, according to the embodiment, the reflecting mirror 20 which reflects the projection light being designed to be attachable and removable, as both surfaces of the reflecting mirror 20 can be used as the reflecting surface M1 and the reflecting surface M2, one reflecting mirror will suffice. Naturally, needless to say, it is also acceptable to arrange in such a way as to include two reflecting mirrors.

Also, according to the embodiment, as the protective section 60 is included which protects a reflecting surface which is not used to reflect the projection light, it is possible to prevent contamination or damage of the reflecting surface. This kind of protective section which protects the reflecting surface not being limited to the kind of material shown in FIG. 6, it is also acceptable to use, for example, a cloth material.

Also, according to the embodiment, the reflecting surface M2 being formed on the other side of the reflecting surface M1, as it is possible to switch between the reflecting surface M1 and the reflecting surface M2 by rotating the reflecting mirror in the reflecting surface switching section, the switching becomes easier.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. A projector which projects an image by means of a projection light onto a surface approximately parallel, or a surface approximately perpendicular, to an installation surface, comprising:
   a first reflecting surface which reflects the projection light toward the approximately parallel surface;
   a second reflecting surface which reflects the projection light toward the approximately perpendicular surface; and
   a reflecting surface switching section which can switchably place the first reflecting surface and the second reflecting surface in an optical path of the projection light,
   wherein shapes of the first reflecting surface and the second reflecting surface differ from each other in curvature.

2. The projector according to claim 1, wherein at least one of the first reflecting surface and the second reflecting surface is an aspherical surface or a free-form surface.

3. The projector according to claim 1, wherein
   one of the first reflecting surface and the second reflecting surface is a planar surface.

4. The projector according to claim 1, further comprising:
   an image inversion section which inverts the image by switching between a case of placing the first reflecting surface in the optical path of the projection light and a case of placing the second reflecting surface in the optical path of the projection light.

5. The projector according to claim 1, wherein
   the reflecting surface switching section has a reflecting mirror, having the first reflecting surface and the second reflecting surface, removable attached thereto.

6. The projector according to claim 1, further comprising:
   a protective section which protects a reflection surface, among the first reflecting surface and the second reflecting surface, which is not placed in the optical path of the projection light.

7. The projector according to claim 1, wherein
   the second reflecting surface is formed on the other side of the first reflecting surface, and the reflecting surface switching section is attached to rotatably switch between the first reflecting surface and the second reflecting surface.

8. The projector according to claim 1, wherein the first reflecting surface and the second reflecting surface are opposite sides of a reflecting mirror.

9. The projector according to claim 5, wherein the thickness of the reflecting mirror increases as the reflecting mirror extends in the longitudinal direction of the reflecting mirror, wherein a curvature in the longitudinal direction of the second reflecting surface increases as the thickness of the reflecting mirror in the longitudinal direction increases.

10. The projector according to claim 1, wherein one or more piezoelectric elements in positioned on a back side of at least one of the first reflecting surface and second reflecting surface, wherein the one or more piezoelectric elements is configured to be driven to adjust the shape of the respective reflecting surface to which the one or more piezoelectric elements is attached.

* * * * *